United States Patent
Rübbelke et al.

(10) Patent No.: US 9,810,488 B2
(45) Date of Patent: Nov. 7, 2017

(54) DEVICE FOR COOLING A FILM, COMPRISING A LEVER SYSTEM

(71) Applicant: Windmöller & Hölscher KG, Lengerich (DE)

(72) Inventors: Ingo Rübbelke, Geselke (DE); Markus Joppe, Mettingen (DE)

(73) Assignee: Windmöller & Hölscher KG, Lengerich (DE)

( * ) Notice: Subject to any disclaimer, the term of this patent is extended or adjusted under 35 U.S.C. 154(b) by 234 days.

(21) Appl. No.: 14/406,250

(22) PCT Filed: May 31, 2013

(86) PCT No.: PCT/EP2013/061298
§ 371 (c)(1),
(2) Date: Dec. 8, 2014

(87) PCT Pub. No.: WO2013/182493
PCT Pub. Date: Dec. 12, 2013

(65) Prior Publication Data
US 2015/0153117 A1    Jun. 4, 2015

Related U.S. Application Data

(60) Provisional application No. 61/657,631, filed on Jun. 8, 2012.

(30) Foreign Application Priority Data

Jun. 8, 2012 (DE) .................. 10 2012 104 963

(51) Int. Cl.
*B29C 47/88*    (2006.01)
*F28F 13/08*    (2006.01)
(Continued)

(52) U.S. Cl.
CPC .......... *F28F 13/08* (2013.01); *B29C 47/0026* (2013.01); *B29C 47/884* (2013.01);
(Continued)

(58) Field of Classification Search
CPC ............ B29C 47/8835; B29C 47/8825; B29C 47/8815; B29C 2947/926;
(Continued)

(56) References Cited

U.S. PATENT DOCUMENTS 4,414,529 A    11/1983   Yoshioka et al.
5,281,375 A *   1/1994   Konermann ........ B29C 47/0026
                                            264/40.3

(Continued)

FOREIGN PATENT DOCUMENTS

CN    1218739    6/1999
CN    101035667    9/2007
(Continued)

OTHER PUBLICATIONS

"Flat Springs Information on GlobalSpec", GlobalSpec, Apr. 13, 2010.*
(Continued)

*Primary Examiner* — Frantz Jules
*Assistant Examiner* — Schyler S Sanks

(57) ABSTRACT

The invention relates to a device for cooling a film (1) which can be produced in a film extrusion system in particular, comprising a housing (11) that has at least one channel (12), at least one inlet opening (13), and at least one outlet opening (14) through which a cooling gas (2) can flow and comprising an adjusting arrangement (10) with which the cooling gas (2) volumetric flow rate that can flow out of the outlet opening (14) and the temperature of the cooling gas (2) that can flow out of the outlet opening (14) can be adjusted. According to the invention, the adjusting arrange-
(Continued)

ment (10) comprises a lever system which has a movable actuator (15) and a movable valve element (16), said actuator (15) acting on the valve element (16) such that an actuating effect of the valve element (16) is reinforced.

16 Claims, 2 Drawing Sheets

(51) Int. Cl.
B29C 47/00 (2006.01)
B29C 47/92 (2006.01)
H01H 37/52 (2006.01)

(52) U.S. Cl.
CPC ............. B29C 47/92 (2013.01); H01H 37/52 (2013.01); B29C 47/8835 (2013.01); B29C 2947/926 (2013.01); B29C 2947/92152 (2013.01); B29C 2947/92161 (2013.01); B29C 2947/92209 (2013.01); B29C 2947/92647 (2013.01); B29C 2947/92971 (2013.01)

(58) Field of Classification Search
CPC .......... B29C 2947/92152; B29C 2947/92971; B29C 47/0026; B29C 47/883; H01H 37/52; F28F 13/08; F28F 2013/008; F16K 31/002; F16K 1/16; F16K 1/165; G05D 23/30
USPC ................. 425/72.1; 236/93 R; 251/231
See application file for complete search history.

(56) References Cited

U.S. PATENT DOCUMENTS

| | | | | |
|---|---|---|---|---|
| 5,580,582 | A * | 12/1996 | Achelpohl | .......... B29C 47/0026 264/209.3 |
| 5,804,221 | A * | 9/1998 | Planeta | ............... B29C 47/8835 264/167 |
| 2007/0098834 | A1* | 5/2007 | Mirek | ................. B29C 47/0026 425/378.1 |
| 2008/0258325 | A1* | 10/2008 | Zimmermann | ....... B29C 47/883 264/40.6 |

FOREIGN PATENT DOCUMENTS

| | | | |
|---|---|---|---|
| DE | WO 2012080276 A2 * | 6/2012 | ........ B29C 47/0021 |
| EP | 0522487 | 1/1993 | |
| EP | 1004424 | 5/2000 | |
| EP | 2052839 | 4/2009 | |
| JP | 03-193330 | 7/2001 | |
| JP | 2002-083523 | 3/2002 | |
| JP | 2011-198485 | 10/2011 | |

OTHER PUBLICATIONS

International Preliminary Report on Patentability dated Sep. 17, 2014 From the International Preliminary Examining Authority Re. Application No. PCT/EP2013/061298.
International Search Report dated Sep. 5, 2013 From the International Searching Authority Re. Application No. PCT/EP2013/061298.

* cited by examiner

DEVICE FOR COOLING A FILM, COMPRISING A LEVER SYSTEM

RELATED APPLICATIONS

This application is a National Phase of PCT Patent Application No. PCT/EP2013/061298 having International filing date of May 31, 2013, which claims the benefit of priority under 35 USC §119(e) of U.S. Provisional Patent Application No. 61/657,631 filed on Jun. 8, 2012, and also claims the benefit of priority of German Patent Application No. 102012104963.7 filed on Jun. 8, 2012. The contents of the above applications are all incorporated by reference as if fully set forth herein in their entirety.

FIELD AND BACKGROUND OF THE INVENTION

The invention relates to a device for cooling a film, which can particularly be generated in a film extrusion system, with a housing, which comprises at least one channel and at least one inlet aperture and at least one outlet aperture, through which a refrigerant gas flows, and a regulating alignment, with which the flow rate of the refrigerant gas which emits through the outlet aperture and the temperature of the emitting refrigerant gas which emits through the outlet aperture is adjustable.

In PCT/EP2011/072648 a device for cooling a film of the before mentioned manner is described. Herewith the device comprises a valve element, which can take diverse positions within the housing, wherein the flow rate of the refrigerant gas which is used for the approaching flow of the film, can be adjusted. Moreover, a temperature manipulation of the refrigerant gas occurs via the heating element assembled within the housing. It is the ambition to raise the functionality and the efficiency of the known regulating alignment.

The objection of the present invention is to further develop a device for cooling a film during the film production in a way, that on the one hand the film can be produced in a simple way with a preferably low difference in film thickness and on the other hand to further increase and optimize the functionality and the efficiency of the therefore necessary regulating alignment.

SUMMARY OF THE INVENTION

The foresaid objection is solved by all features of claim 1. In the dependent claims advantageous developments are described.

According to the invention it is intended, that the regulating alignment contains a lever system, which comprises a movable actuator and a movable valve element, wherein the actuator affects the valve element in a way that the regulating action of the valve element is increased. A characteristic of the present invention is, that the to be adjusted valve element can be brought in its respective position more efficiently via the actuator. Moreover the actuator arranges that a high regulating action of the flow rate of the refrigerant gas by regulating the valve element is achieved, by an affection of the actuator at a defined position at the valve element. A reduced deflection of the actuator causes according to the invention that the valve element adapts a larger displacement or a larger change of position, wherein the larger regulating action can be realized.

According to the invention the invention comprises that the valve element is facing the flow of the refrigerant gas and that the actuator is averting the flow of the refrigerant gas.

The valve element determines according to the invention the cross section of the channel, through which the refrigerant gas can flow in the direction of the outlet aperture.

Via the regulating alignment the flow rate of the refrigerant gas and the temperature of the refrigerant gas can be adjusted at the same time in order to realize an optimization of the section thickness of the film. In order to regulate the thickness of the film particularly of the film tubing an extruding plastic melt which for example leaks from the blow head of a film extrusion system is variably heated and/or cooled down via the device according to the invention, wherein the thickness profile of the film is adjustable or manipulable. Herein the properties are utilized that during the formation of the film from the film extrusion system the heated areas are more intensely and the cooler areas are less intensely extended. This means that a higher tempered refrigerant gas causes a thinner leaching of the film. Parallel the invention comprises the technical advantage that beneath the adjustment of the temperature of the refrigerant gas at the same time the flow rate of the refrigerant gas can be varied in an intelligent way, namely depending on the temperature of the refrigerant gas. This means that during a low flow rate of the refrigerant gas the film can be leached or thinned down even more, wherein a regulating action of both parameters namely the refrigerant gas flow rate and the refrigerant gas temperature can be increased by a multiple. Therefore the regulating alignment according to the invention is able to adjust the thickness profile of the film in a short time.

Likewise it is possible that the regulating alignment according to the invention arranges that the refrigerant gas flow rate is controlled and/or regulated in dependence on the refrigerant gas temperature and vice versa, this means, that during a modification of the temperature of the refrigerant gas at the same time and parallel the flow rate of the refrigerant gas can be changed. In order to achieve thinning of the film in defined areas the device according to the invention can for example function in a way that beneath the elevation of the refrigerant gas temperature at the same time the flow rate of the refrigerant gas is reduced concerning the respective area of the film.

It is intended as an advantage that the valve element designates the cross section of the channel. Herewith the actuator is actively connected to the valve element, wherein the valve element correspondingly alters its position via a deflection of the actuator, wherein the flow rate of the refrigerant gas can be efficiently adjusted.

Moreover, the invention can comprise a regulating alignment with at least one heating element, wherein the temperature of the refrigerant gas can be adjusted. The flow rate of the refrigerant gas as well as the temperature of the refrigerant gas can herewith be operated and/or regulated at the same time. The regulating alignment thereby arranges that the refrigerant gas flow rate and the refrigerant gas temperature can be adjusted at the same time according to defined parameters. The refrigerant gas flowing through the housing and through the channel is tempered accordingly via the heating element. Moreover, the flow rate of the refrigerant gas can be adjusted respectively via the lever system, so that a directed flow rate with a defined temperature leaves the housing and hits the film in a defined area in order to respectively adjust the thickness of the film.

Advantageously, the regulating alignment can comprise a gear which is in active connection to the actuator. Herewith the gear can be an electric gear or pneumatic gear or a hydraulic gear or the heating element can be the gear for the actuator and/or the valve element.

In another step improving the invention the position of the valve element can be altered via an alteration of the position of the actuator. Herewith, it can be an advantage that the valve element is pivotably arranged around an axis within the housing. Advantageously the axis is facing the inlet aperture.

In another advantageous step the actuator and/or the valve element can be a bimetal element. It is an advantage that the actuator is a deformable bimetal element by which the flow rate of the refrigerant gas can be additionally altered by an alteration of the temperature of the refrigerant gas through a decrease or an increase of the cross section of the channel through which the refrigerant gas flow rate can be guided. The bimetal element can herewith be coupled with the heating element so that via an alteration of the refrigerant gas temperature the refrigerant gas flow rate which flows around the bimetal element (actuator) at the same time arranges that the actuator correspondingly deforms and/or adjusts, wherein at the same time the valve element is altered in its position. Hereby the flow rate of the refrigerant gas can be varied within the channel.

Moreover, it is possible that the cross section of the outlet aperture can be altered by an alteration of the position of the valve element, particularly in a zero position of the valve element the outlet aperture is opened and in a possible operating status of the valve element the diameter of the outlet aperture is reduced up to 60%-85% of the zero position. Hereby a great alteration of the position of the valve element can be achieved via a minor alteration of the position of the actuator, wherein the various operating positions of the valve element can be realized.

The invention further contains, that the lever system comprises at least one lever unit which comprises a plurality of movable valve elements which are connected to each other via a web, wherein particularly the web and the valve element build a monolithic component. The valve elements are each movably assembled in a channel, wherein the housing comprises the single channels with the lever system and the at least one lever unit. Advantageously the number of actuators can be smaller than the number of the valve elements. Hereby it can be sufficient that one or a small number of actuators each affect a valve element. By a movement of the actuator a deflection of the valve element being actively connected with the respective actuator occurs. Since all valve elements are connected via a common web a movement of the remaining valve elements in the respective channels occurs at the same time. It is possible that a plurality of lever elements can be intended within the housing of the device according to the invention.

In a possible embodiment of the invention the monolithic component can be a metallic cutting element which is assembled from a web and the therewith connected valve elements. Herewith the monolithic component can comprise a compartment-like geometry.

Moreover it is possible that the regulating alignment comprises at least one base body within the housing, which comprises a plurality of channels for the refrigerant gas wherein in each channel a valve element is assembled. Herewith the invention can also contain that the base body comprises a ground which receives the heating element and/or rests on the valve element and/or the actuator and/or the lever unit.

In another step improving the invention the housing can be shaped ring-like by an assembly of a plurality of actuators and valve elements wherein the flow direction of the refrigerant gas runs radially towards the ring-like housing or that the housing is shaped beam-like in a way that a plurality of actuators and valve elements are assembled next to each other. The number of valve elements can be greater than the number of actuators.

The regulating action of the regulating alignment can be increased in a way that the valve element comprises a loose edge which is facing the outlet aperture and that the actuator comprises a loose edge which is facing the inlet aperture wherein particularly the distance between the loose edge of the actuator and the axis of the valve element is smaller than the distance between the loose element of the valve element and the loose element of the actuator. Thereby it can be sufficient that via a minor adjustment or alteration of the position the loose edge of the actuator which is directly acting on the valve element affects a greater alteration of the position of the loose edge of the valve element wherein a greater alteration of the diameter of the channel can be achieved through which the refrigerant gas flows and affects the film at a defined area.

In a possible embodiment according to the invention the regulating alignment comprises a plurality of heating elements wherein each heating element is related to a channel. The heating element can for example be a heating cartridge. Via the lever system with the increased regulating action it has been shown that a reduced heating energy for the heating element or for the heating elements is necessary in order to achieve the same regulating action.

BRIEF DESCRIPTION OF THE DRAWINGS

Further advantages, features and details arise from the following description in which a plurality of execution examples of the invention are described in full detail in reference to the drawings. Thereby the features mentioned in the claims and in the description can be individually or in any combination be essential for the invention. It is shown:

DESCRIPTION OF SPECIFIC EMBODIMENTS OF THE INVENTION

Figure 1:
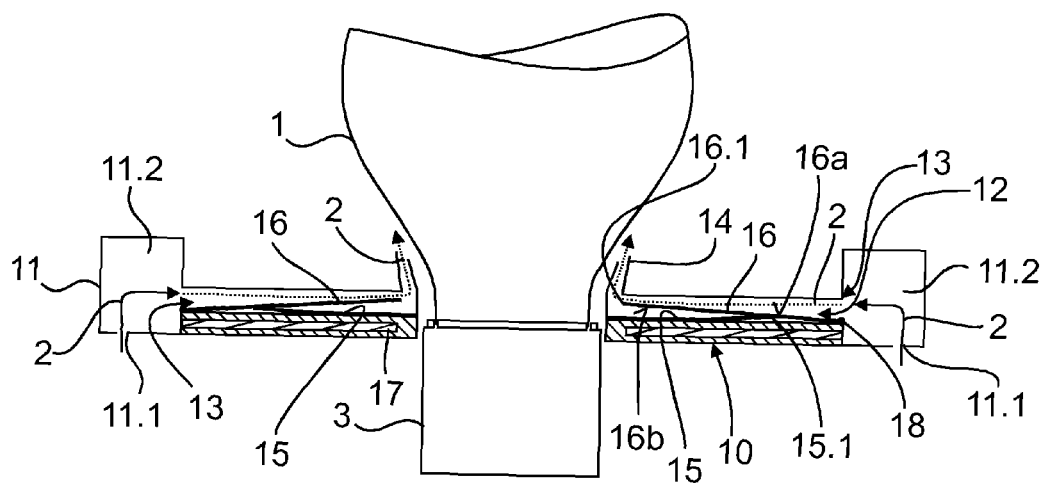
FIG. 1 a schematic sectional view of the device according to the invention for cooling the film with a regulating alignment, which comprises a lever system, FIG. 2 a possible top view of an execution example of a regulating alignment, which can be applied according to FIG. 1, FIG. 3 another illustration of an execution example of a possible regulating alignment, and FIG. 4 a schematic top view of a lever unit, which is assembled in a regulating alignment.

In FIG. 1 a device for cooling a film 1 is schematically shown, which can be generated in a not explicitly shown film extrusion system. In the present executive example a blown film extrusion system is included, which causes the outlet of the film 1 via a blow head 3. The shown executive examples are referring to diverse extrusion systems particularly referring to flat film extrusion systems, which also work with a blow head, from which the film escapes.

A housing 11 of the cooling device according to the invention is intended with a distance to the blow head 3 in order to cool down the film 1 escaping from the blow head 3. The cooling device correlates essentially with the described cooling unit from document PCT/EP2011/072648.

Herewith the film 1 is cooled via a refrigerant gas 2 in defined areas, wherein a regulating alignment 10 arranges for the level of the flow rate of the refrigerant gas 2 which is acting on the film 1, and for the level of the temperature of the refrigerant gas 2. Within the housing 11 a plurality of channels 12 is intended, wherein each channel comprises an inlet aperture 13 and outlet aperture 14 for the refrigerant gas 2. The regulating alignment 10 comprises a lever system, wherein in each channel 12 the lever system conducts a movable valve element 16. At the valve element 16 according to FIG. 1 acts a movable actuator 15. In FIG. 1 the zero position of the actuator 15 is not shown. In the zero position the actuator 15 rests in a horizontal position, wherein the valve element 16 rests directly on the actuator 15. The actuator 15 is in direct contact with the valve element 16. If a movement of the actuator 15 from zero position in the shown operating position occurs via a gear, the valve element 16 is deviated about its axis 18 wherein the diameter of the channel 12 is altered and thereby the flow rate of the refrigerant gas 2 is affected.

In the present executive example the actuator 15 is a bimetal element. Moreover the regulating alignment 10 comprises a heating element 17, which can bring the actuator 15 from its zero position in its actuating position via a defined insertion of a temperature. The heating element 17 functions as a gear for the movement of the actuator 15 in order to deviate the valve element 16 in the desired position. Alternatively it is possible that the gear for the actuator 15 is realized via an electric gear or via a pneumatic gear or via a hydraulic gear.

Moreover the heating element 17 has the function to influence or to vary the temperature of the refrigerant gas 2 which flows through the housing 11.

Like shown in FIG. 1 the valve element 16 comprises a loose edge 16.1, which is facing the outlet aperture 14. On the contrary, the actuator 15 comprises a loose edge 15.1 which is facing the inlet aperture. Since the loose edge 15.1 of the actuator 15 acts relatively concentric at the valve element 16, a solid and effective regulating action of the valve element 16 can be achieved. The further the loose edge 15.1 acts on the lower side 16b of the valve element 16 towards the axis 18 the higher a regulating action of the valve element 16 can be achieved.

The upper side 16a of the valve element 16 is facing the flow of the refrigerant gas 2. At the lower side 16b of the valve element 16 however, the actuator 15 acts with its loose edge 15.1. Thereby the actuator 15 is averted towards the flow of the refrigerant gas 2.

In order for the refrigerant gas 2 can flow into the housing 11, the housing 11 comprises an inlet opening 11.1. The refrigerant gas 2 reaches the channel 12 via a storage room 11.2, wherein at the same time related to the standards concerning the thickness of the film 1 the regulating alignment 10 of the flow rate of the refrigerant gas 2 and the temperature of a refrigerant gas 2 can be varied. This occurs via a corresponding position alteration of the valve element 16 and a corresponding insertion of warmth in the refrigerant gas 2 via the heating element 17.

Figure 2:
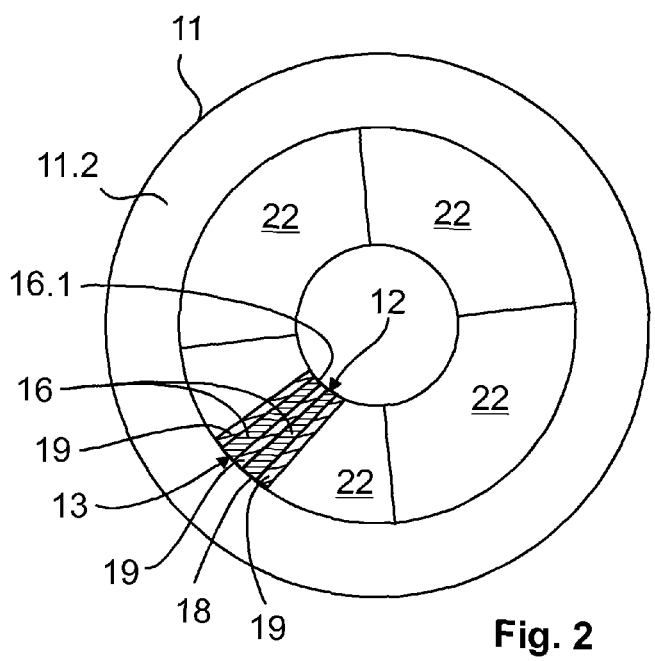
Figure 3:
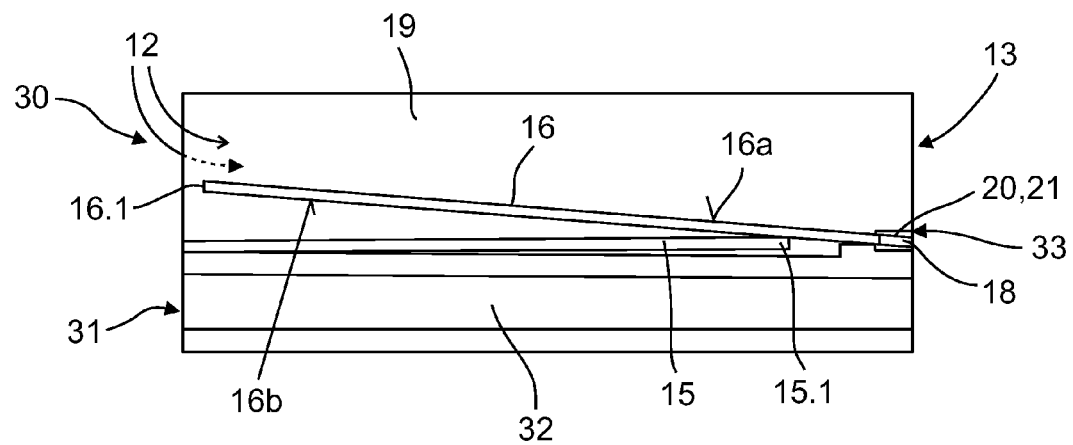
Figure 4:
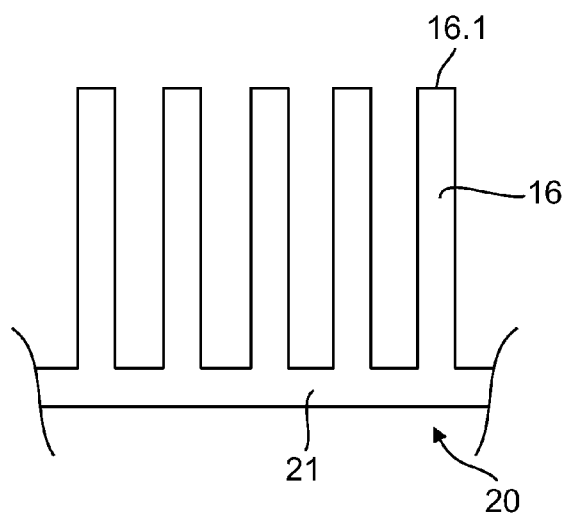

In FIG. 2 a schematic top view of the cooling device according to the invention is shown with the regulating alignment 10. It is obvious, that the regulating alignment 10 comprises a plurality of valve elements 16 as well as a plurality of actuators 15 are intended, in order to respectively move the valve element 16 in an actuation position. The shown lever system of the regulating alignment 10 comprises a plurality of lever units 20 which are performed from a plurality of movable valve elements 16. It is also referred to according to FIG. 3. The valve elements 16 are connected to one another via a web 21, which is shown in FIGS. 3 and 4. The web 21 and the valve elements 16 of each lever unit 20 perform a monolithic component. For example it is possible that this monolithic component is a metallic cutting element, particularly a metal sheet. The monolithic component is shaped chamber-like according to FIG. 2 to FIG. 4. In order to respectively move each lever unit 20 an actuator 15 only acts on the valve element 16. If the actuator 15 is deviated a movement of the valve element 16 which is in contact at the actuator 15 occurs at the same time which deviates about the axis 18. At the same time the valve elements 16 deviate which are connected with a common web 21 whereby the valve element 16 reaches its actuating position within its channel. Hereby alterations of the diameter in each channel 12 can be achieved. A possible lever unit 20 is moreover shown in FIG. 4.

Furthermore, FIGS. 2 and 3 show that the regulation alignment 10 comprises a base body 30 with a ground 31. The base body 30 comprises a plurality of channels 12 in which the valve elements 16 are movably mounted. The lever unit 20 is inserted in an acceptance 33 of the base body, wherein the web 21 is reliably held in said acceptance 33. Moreover it is ensured that the lever unit 20 can be deviated about the axis 18. Furthermore, the ground 31 comprises an acceptance 32, in which the heating element 17 can be inserted. Each channel 12 is limited by a channel wall 19.

In FIG. 2 a plurality of base bodies 30 can be assembled, which are insertable in the housing 11. The housing 11 can be contracted from a plurality of sectors 22, in which each one or a plurality of base bodies 30 is insertable. Exemplary only a portion of a sector 22 is shown, in which a base body 30 is positioned with a regulating alignment 10. The actual achievement provides that the housing 11 is completely fulfilled with one or a plurality of regulating alignments 10, particularly valve elements 16, actuators 15 etc. According to FIG. 2 the housing 11 is shaped ring-like, by positioning a plurality of actuators 15 and valve elements 16, wherein the flow direction of the refrigerant gas 2 proceeds radial towards the ring-like housing 11. Naturally in a not explicitly shown alternative execution example it is possible that the housing 11 is shaped rod-like, by assembling a plurality of actuators 15 and valve elements 16, which are assembled next to each other. Herewith reference is made to document PCT/EP2011/072648, which shows such a line-like assembly of valve elements in FIG. 7. In both cases the application of base bodies 30 according to FIG. 3 is possible.

REFERENCE SIGNS

1 Film
2 Refrigerant gas
3 Blow head
10 Regulating alignment
11 Housing
11.1 Inlet opening
11.2 Storage room
12 Channel
13 Inlet aperture
14 Outlet aperture
15 Actuator
15.1 Loose edge
16 Valve element
16a Upper side
16b Lower side
16.1 Loose edge
17 Heating element
18 Axis
19 Channel wall
20 Lever unit
21 Web 22 Sector
30 Base body
31 Ground
32 Acceptance for 17
33 Acceptance for 20

What is claimed is:

1. A device for cooling a film (1) which is producible in a film extrusion system, comprising
    a housing (11) which comprises at least one channel (12), at least one inlet aperture (13) and at least one outlet aperture (14) through which refrigerant gas (2) is flowable,
    a regulating alignment (10) with which the flow rate of the refrigerant gas (2) through the at least one outlet aperture (14) and the temperature of the refrigerant gas (2) through the at least one outlet aperture (14) is adjustable,
    characterized in that:
    the regulating alignment (10) contains a lever system, which comprises a movable actuator (15) and a movable valve element (16), wherein the actuator (15) acts on the valve element (16) to regulate the valve element (16),
    wherein the regulating alignment (10) comprises at least one heating element (17),
    wherein the temperature of the refrigerant gas (2) is adjustable,
    wherein the at least one heating element (17) is a gear for the actuator (15) or the valve element (16),
    wherein the actuator or the valve element (16) is a bimetal element wherein the valve element (16) is facing the flow of the refrigerant gas (2) and the actuator (15) is facing an incoming flow of refrigerant gas (2), wherein the regulating alignment (10) comprises the lever system,
    wherein the movable valve element (16) and the actuator (15) are within the at least one channel (12),
    wherein the valve element (16) comprises a loose edge (16.1) which is facing the outlet aperture (14) and the actuator (15) comprises a loose edge (15.1) which is facing the inlet aperture (13), and
    wherein a distance between the loose edge (15.1) of the actuator (15) and an axis (18) of the valve element (16) is smaller than a distance between the loose edge (16.1) of the valve element (16) and the loose edge (15.1) of the actuator (15).

2. The device according to claim 1,
characterized in that
the actuator (15) is operatively connected to the valve element (16).

3. The device according to claim 1,
characterized in that
the valve element (16) determines the cross section of the at least one channel (12).

4. The device according to claim 1
characterized in that
the regulating alignment (10) comprises the gear, which is operatively connected to the actuator (15).

5. The device according to claim 1
characterized in that
through an alteration of the position of the actuator (15) the position of the valve element (16) is alterable.

6. The device according to claim 1
characterized in that
the valve element (16) is pivotally mounted about the axis (18) within the housing).

7. The device according to claim 1
characterized in that
the loose edge (15.1) of the actuator (15) contacts the valve element (16), wherein the loose edge (15.1) of the actuator (15) faces the incoming flow of the refrigerant gas (2).

8. The device according to claim 1
characterized in that
the cross section of the outlet aperture (14) is alterable by an alteration of the position of the valve element (16), wherein in a zero position of the valve element (16) the outlet aperture (14) is opened, and the cross section of the outlet aperture (14) is reducible to within a range of 60%-85% of the zero position by the alteration of the position of the valve element (16).

9. The device according to claim 1
characterized in that
the lever system comprises at least one lever unit (20) which comprises a plurality of the movable valve elements (16) which are connected to one another through a web (21), wherein the web (21) and the valve elements (16) form a monolithic component.

10. The device according to claim 1
characterized in that
the regulating alignment (10) comprises at least one base body (30) within the housing (11) which contains the at least one channel (12), wherein in the at least one channel (12) the valve element (16) is assembled.

11. The device according to claim 1
characterized in that
the housing (11) has a circular shape in which a plurality of the actuators (15) and a plurality of the valve elements (16) are assembled, wherein the flow direction of the refrigerant gas (2) runs radial towards a blow head (3).

12. The device according to claim 1
characterized in that
the regulating alignment (10) is configured to simultaneously alter the temperature and flow rate of the refrigerant gas (2).

13. The device according to claim 6,
characterized in that
the axis (18) is facing the inlet aperture (13).

14. The device according to claim 9,
characterized in that,
the monolithic component is a metallic stamped part.

15. The device according to claim 10,
characterized in that
the at least one base body (30) comprises a ground (31) which receives the heating element (17) or on which rests the valve element (16), the actuator (15) or a lever unit (20).

16. A device for cooling a film (1) which is producible in a film extrusion system, comprising
    a housing (11) which comprises at least one channel (12), at least one inlet aperture (13) and at least one outlet aperture (14) through which refrigerant gas (2) is flowable,
    a regulating alignment (10) with which the flow rate of the refrigerant gas (2) through the at least one outlet aperture (14) and the temperature of the refrigerant gas (2) through the at least one outlet aperture (14) is adjustable,
    characterized in that:
    the regulating alignment (10) contains a lever system, which comprises a movable actuator (15) and a movable valve element (16), wherein the actuator (15) acts on the valve element (16) to regulate the valve element (16), wherein the regulating alignment (10) comprises at least one heating element (17), wherein the temperature of the refrigerant gas (2) is adjustable, wherein the at least one heating element (17) is the gear for the actuator (15) or the valve element (16), wherein the actuator (15) or the valve element (16) is a bimetal element, wherein both the valve element (16) and the actuator (15) are in the at least one channel (12), wherein the valve element (16) includes a loose edge (16.1) that faces the at least one outlet aperture (14) and the actuator (15) includes a loose edge (15.1) facing the at least one inlet aperture (13) and wherein the valve element (16) rests on the actuator (15).

\* \* \* \* \*